United States Patent
Cari et al.

(10) Patent No.: US 6,671,603 B2
(45) Date of Patent: Dec. 30, 2003

(54) EFFICIENCY-BASED ENGINE, POWERTRAIN AND VEHICLE CONTROL

(75) Inventors: Michael J Cari, Berkley, MI (US); Timothy A Coatesworth, Lake Orion, MI (US); Gregory L Ohl, Ann Arbor, MI (US); Sven Merkle, Stuttgart (DE)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/027,980

(22) Filed: Dec. 21, 2001

(65) Prior Publication Data

US 2003/0120410 A1 Jun. 26, 2003

(51) Int. Cl.[7] .................. G06F 17/00; F02N 11/02; F02D 41/00
(52) U.S. Cl. ..................... 701/54; 701/84; 123/349
(58) Field of Search ................... 701/54, 84, 87, 701/88; 475/2, 5; 180/65.2, 65.3; 123/349, 350, 406.23, 406.24, 436, 480

(56) References Cited

U.S. PATENT DOCUMENTS

| | | | | |
|---|---|---|---|---|
| 4,098,244 A | * | 7/1978 | Sumiyoshi et al. | 123/17 R |
| 4,166,437 A | | 9/1979 | Bianchi et al. | 123/32 EC |
| 4,489,690 A | | 12/1984 | Burkel et al. | 123/419 |
| 5,692,471 A | * | 12/1997 | Zhang | 123/350 |
| 5,692,472 A | * | 12/1997 | Zhang | 123/350 |
| 5,788,004 A | * | 8/1998 | Friedmann et al. | 180/65.2 |
| 5,832,897 A | | 11/1998 | Zhang | 123/352 |
| 5,988,140 A | | 11/1999 | Gartner et al. | 123/406.24 |
| 5,998,901 A | * | 12/1999 | Kawabata et al. | 310/114 |
| 6,000,376 A | | 12/1999 | Hess et al. | 123/333 |
| 6,029,625 A | | 2/2000 | Bischof et al. | 123/399 |
| 6,085,724 A | | 7/2000 | Schmidt et al. | 123/350 |
| 6,090,005 A | * | 7/2000 | Schmidt et al. | 475/5 |
| 6,131,546 A | | 10/2000 | Vogt et al. | 123/406.23 |
| 6,154,701 A | | 11/2000 | Loffler et al. | 701/54 |
| 6,173,574 B1 | * | 1/2001 | Obayashi et al. | 60/710 |
| 6,340,847 B1 | * | 1/2002 | Kawabata et al. | 290/40 |

* cited by examiner

Primary Examiner—Tan Q. Nguyen
Assistant Examiner—Dalena Tran
(74) Attorney, Agent, or Firm—Edwin W. Bacon, Jr.

(57) ABSTRACT

A method is provided for controlling power units of a vehicle powertrain for optimizing their respective efficiencies, thereby optimizing an overall vehicle efficiency. The method includes the steps of determining an efficiency of a power unit, determining present operational data of the power unit, determining a torque to be provided to the vehicle powertrain, determining a plurality of optimization constraints as a function of the torque to be provided, the present operational data and the efficiency of the power unit, determining an optimized operation mode of the power unit as a function of the optimization constraints and the present operational data of the power unit, and manipulating the power unit to operate in the optimized operation mode.

27 Claims, 3 Drawing Sheets

EFFICIENCY-BASED ENGINE, POWERTRAIN AND VEHICLE CONTROL

FIELD OF THE INVENTION

The present invention relates to vehicle control methods and more particularly to an efficiency-based vehicle control method.

BACKGROUND OF THE INVENTION

Conventional internal combustion engines include a limited number of control inputs. Among the various control inputs, there are three main inputs: ignition angle, fuel flow rate (fuel mass) and airflow rate. For a traditional cable throttle vehicle, a driver's input translates to a desired airflow rate, leaving ignition angle and fuel flow rate as control variables. Given the airflow rate, an "optimized" ignition angle and fuel flow rate may be determined as a function of the best power, best emissions, and best fuel economy or as a compromise therebetween.

There is an increasing need within the automotive industry for simultaneous improvements in the areas of vehicle performance, improved emissions and fuel economy. In pursuit of these goals, increasingly complex technical solutions for optimizing vehicle and powertrain performance have been implemented. As a result of these technical solutions many actuation mechanisms have been introduced for providing a performance control means. Among many others, these actuators may include: electronic throttle control, variable valve timing, cylinder deactivation, direct injection, continuously variable transmission and the like. In order to realize the maximum benefit of these actuators, improved interfaces between the various vehicle systems need be developed.

As the amount and variety of these actuators increase, choosing the optimal positioning of each at any given instant becomes an increasingly complex task. Commonly, non-unique actuator position solutions are available for a given "optimization goal". The difficulty in determining the desired actuator position is compounded, as there are no standard actuator configurations. In other words, different vehicle types and powertrain layouts implement different types and numbers of actuators. Thus, each vehicle layout requires respective control and calibration strategies.

Therefore, it is desirable in the industry to develop a generic control method that will determine and assign optimal actuator positions. The actuator position determination should be a function of a given optimization goal, the particular vehicle system configuration and the particular constraints of the vehicle system configuration. The generic control method should be flexible for future consideration of powertrain configurations, such as simple internal combustion engines with stepped transmissions or advanced powertrains such as electric hybrids and fuel cell powered vehicles.

SUMMARY OF THE INVENTION

Accordingly, the present invention provides a vehicle including a powertrain having a power unit, an actuator associated with the power unit for selectively manipulating operation of the power unit, a sensor for sensing operational performance of the power unit and an efficiency controller in communication with the actuator and the sensor. The controller performs the method of the present invention, whereby the controller receives present operational data and efficiency data from the sensor for determining an optimized operation mode of the power unit and accordingly actuates the actuator for operating the power unit in the optimized operation mode.

The present invention provides a method of controlling a vehicle system having a power unit. The method includes the steps of: determining an efficiency of the power unit, determining present operational data of the power unit, determining a torque to be provided to the vehicle system, determining a plurality of optimization constraints as a function of the torque to be provided, the present operational data and the efficiency of the power unit, determining an optimized operation mode of the power unit as a function of the optimization constraints and the present operational data of the power unit, and manipulating the power unit to operate in the optimized operation mode.

The efficiency-based control method of the present invention addresses the needs described hereinabove. Essentially, all vehicle system components are characterized in terms of their respective efficiencies, thereby enabling the control method to be generic, and are then related to an overall vehicle system efficiency.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, .

DETAILED DESCRIPTION OF THE PREFERRED EMBODIMENTS

The following description of the preferred embodiments is merely exemplary in nature and is in no way intended to limit the invention, its application, or uses.

Figure 1:
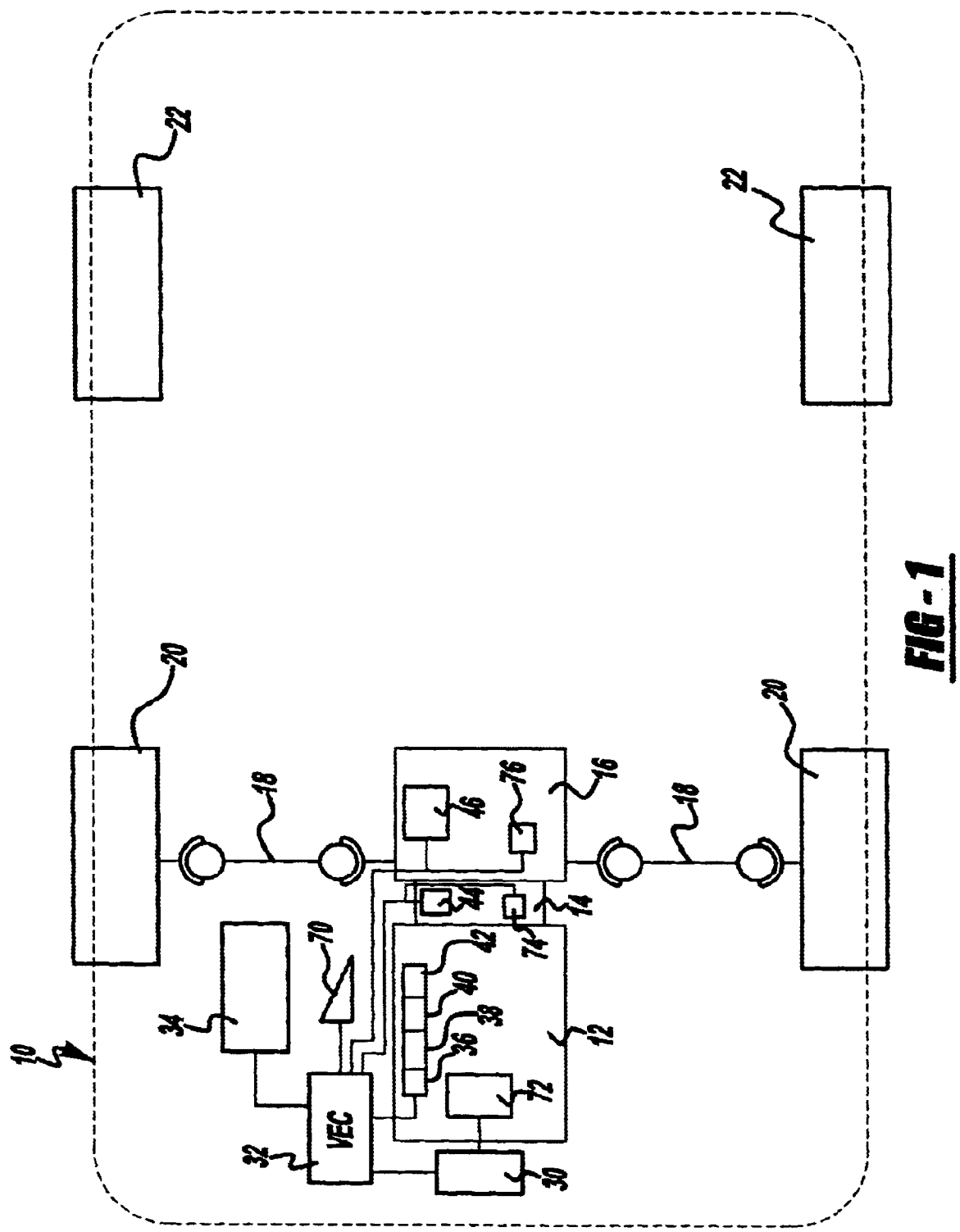
FIG. 1 is a schematic view of a vehicle powertrain in accordance with the principles of the present invention.

With reference to FIG. 1, an exemplary vehicle powertrain 10 is schematically shown. The vehicle powertrain 10 is a front-wheel drive powertrain including an engine 12, a torque converter 14, a transmission 16, a pair of driveshafts 18, a pair of front wheels 20 and a pair of rear wheels 22. It will be appreciated, however, that the present invention may be implemented with any one of a number of vehicle powertrain configurations commonly known in the art, including, but not limited to, rear-wheel drive and four-wheel drive powertrains. This invention can also be applied to hybrid gasoline-electric, diesel-electric electric or fuel cell vehicles. In the exemplary embodiment, the engine 12 is a multi-cylinder, V-configured, internal combustion engine, however, it will be appreciated that the engine 12 may be substituted for others commonly known in the art. The engine 12 provides drive torque to the other components of the vehicle powertrain 10 and is operatively attached to the transmission 16 through a torque converter 14. The transmission 16 manipulates the output drive torque of the engine 12 through a series of selectable gear reductions. The transmission 16 of the exemplary embodiment is automatic, however, it will be appreciated that a manual transmission may be substituted therefor. Use of a manual transmission relieves the requirement of a torque converter 14. Thus, the torque converter 14 may also represent a clutch 14 in the case of a manual transmission. It will be further appreciated that the transmission 16 may be a continuously variable transmission (CVT). The driveshafts 18 operably interconnect the transmission 16 and the front wheels 20 for driving the front wheels 20.

The engine 12 includes a controller 30 for controlling various parameters at which, the engine 12 operates. These parameters include the air/fuel mixture (A/F ratio), ignition angle, injection timing, throttle position, valve timing duration and/or overlap, and lift. The controller 30 may vary each of these parameters, whereby the engine 12 may be manipulated to operate with maximized efficiency. The present invention provides a vehicle efficiency coordinator (VEC) 32 that is in electrical communication with the controller 30, and the various power units. A power unit may be one of either a power producer or consumer, including the engine 12, vehicle accessories including radio, lighting, power systems, A/C, heaters and the like, collectively represented at 34, the torque converter/clutch 14 and the transmission 16. More specifically, the VEC 32 is in electrical communication with a sensor group of the engine 12, including a crankshaft angle sensor 36, an intake manifold pressure sensor 38, a fuel-mass sensor (in the case of a diesel or DI-stratified engine) 40, an A/F sensor 42, a throttle position sensor 43, a cam shaft position sensor 45, a valve position sensor 47 and the like. Further, the VEC 32 is in electrical communication with a sensor 44 of the torque converter/clutch and a sensor 46 of the transmission 16. The VEC 32 is able to receive real-time vehicle operation information from the various sensors, perform the hereindescribed efficiency-based control method, and manipulate the engine parameters through the controller 30, for operating the engine 12 at increased efficiency. The VEC 32 communicates via a serial bus to sub-unit controllers (not shown) of each power unit. The information communicated therebetween is generally efficiency, torque and/or speed.

Each of the major power units (i.e. engine 12, torque converter 14, transmission 16, etc.) includes a set of respective actuators. The engine 12 includes an actuator pack 72 for manipulating engine operational parameters such as ignition angle, A/F ratio, throttle position, valve timing, duration and lift, and the like. The torque converter 14 includes an actuator 74 for manipulating operation thereof, such as in the case of a variable pitch or lock-up torque converter. Further, the transmission 16 includes an actuator pack 76 for manipulating the operational parameters of various transmission components including clutches, bands, servos and the like. The specific type of actuators present with the transmission 16 may vary in accordance with the particular transmission configuration (i.e. automatic, manual, CVT).

Figure 2:
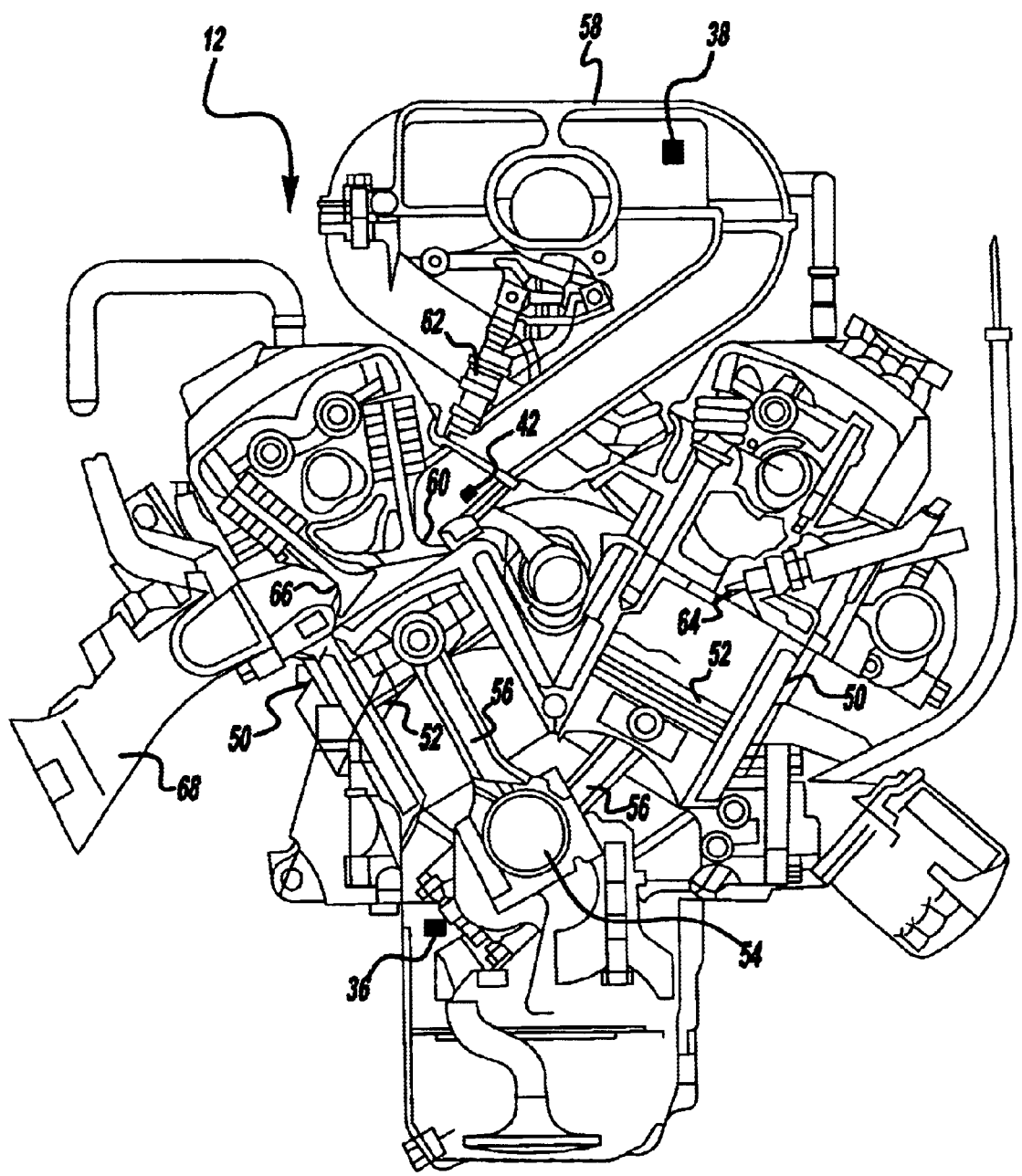
FIG. 2 is a schematic view of an engine cross-section detailing relevant engine components.

FIG. 2 is a cross-sectional, schematic view of the engine 12. Generally, the engine 12 includes a plurality of cylinders 50 having a piston 52 slidably disposed therein. The piston 52 is operably interconnected with a crankshaft 54 through a connecting rod 56. An intake manifold 58 is also included for selectively directing intake air into the cylinder 50 through an intake valve 60. A fuel injector 62 is disposed within the intake manifold 58 for injecting fuel into the intake air at an appropriate A/F ratio. A spark plug 64 is further included for igniting the A/F mixture within the cylinder 50, forcing the piston 52 to travel downward within the cylinder 50, thereby rotatably driving the crankshaft 54. An exhaust valve 66 selectively exhausts residual combustion gases through an exhaust manifold 68. The throttle position sensor 43 is used as feedback for control of air-flow through the engine 12. The cam shaft position sensor 45 is used to determine the duration and overlap of valve events. The valve position sensor 47 monitors the lift of the valves 60,66. The fuel injector 62 and spark plug 64 are in operable communication with the controller 30, whereby the controller 30 may selectively manipulate the operating parameters of each.

The crankshaft angle sensor 36 is in operable communication with the crankshaft 54 for determining the crankshaft angle at ignition of the spark plug 64. The intake manifold pressure sensor 38 is intermediately disposed within the intake manifold 58 for determining instantaneous pressure within the intake manifold 58. The fuel-mass sensor 40 is provided for diesel or DI-stratified engines and determines an actual fuel-mass for a particular cylinder 50. Finally, the A/F sensor 42 is disposed intermediate the fuel injector 62 and intake valve 60 for determining an actual A/F value. Each of the above-described sensors is functional during operation of the engine and provides real-time operating data to the VEC 32.

Figure 3:
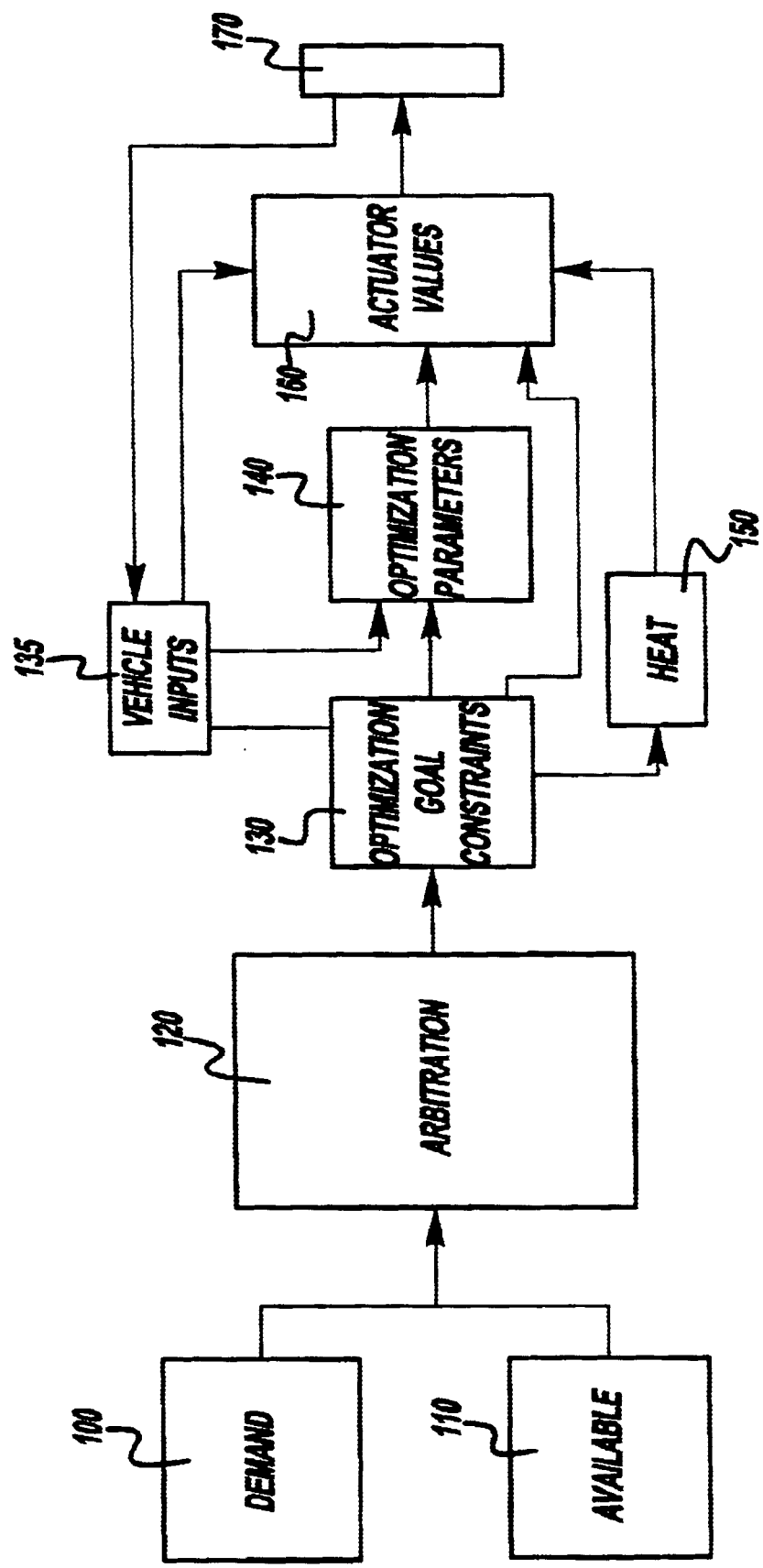
FIG. 3 is a flowchart detailing an efficiency-based vehicle control method in accordance with the principles of the present invention.

With particular reference to FIG. 3 the efficiency-based control method of the present invention will be described in detail. At the outset, it should be noted that the VEC 32 performs the hereindescribed algorithm and sends response signals to the various actuators for responsively operating the various vehicle components at their combined optimal efficiency. In general, the VEC 32 receives efficiency data from power units and consumers (i.e. engine 12, accessories 34, transmission 16, and the like), an operator's demand and real-time vehicle data to determine the optimum operating parameter for each power unit, thereby maximizing the overall operating efficiency of the vehicle. Each power unit is in communication with the VEC 32 for broadcasting their respective efficiencies for present conditions, as well as predicted efficiencies for scenarios presented by the VEC 32.

Initially, at step 100, a vehicle operator provides an input or torque demand by depressing an acceleration pedal 70. Alternatively, however, the torque demand may be provided by a cruise control system, concurrently represented at 70. This torque demand is representative of the amount of drive torque desired at the driven wheels of the vehicle powertrain 10 and is received as a signal by the VEC 32. The amount of torque available from a flywheel (not shown) of the engine 12 is concurrently determined by the controller 30 and relayed as a signal to the VEC 32, at step 110. At step 120, an arbitration process is performed to determine whether the available torque will fulfill the operator's demand or be used for other purposes, such as but not limited to, traction control.

At step 130, optimization goal constraints are determined. These constraints are a function of the real-time vehicle data received from the various sensors described herein and the torque availability results of step 120. Included in the optimization goal constraints are: the combustion mode of the engine 12, a maximum A/F value, a minimum A/F value, a maximum ignition angle value, a minimum ignition angle value, the engine injection pattern. Current operational data, including particular power unit efficiencies, is also provided at step 135 and used as input for determining the optimization goal constraints and other operations described therein. At step 140, a parameter optimization routine receives the optimization goal constraints and the real-time vehicle data as input, for determining optimized actuator positions for the various actuators described herein. Concurrently, a heat quantity calculation is performed at step 150, which utilizes optimization goal constraints and parameter optimization results to determine the required heat quantity to achieve the desired goal.

It should be noted that the power unit efficiency data mentioned above may be provided in two forms. Initially, present power unit efficiency may be communicated to the VEC 32, which is representative of the actual operating efficiency of the particular power unit. Further, a theoretical power unit efficiency may be communicated to the VEC 32, which is a calculated efficiency based upon a specific scenario the VEC 32 presents to the particular power unit. Essentially, the VEC 32 may relay a hypothetical operational configuration for a particular power unit, and the power unit responds by communicating a theoretical efficiency based upon the hypothetical.

Finally, at step 160, an actuator value assignment routine is performed using the optimized actuator positions determined in steps 130 and 140 as input values. The actuator assignment routine signals the actuators, at step 170, to operate at a specific position, thereby causing the actuator's associated power unit to operate in a corresponding manner.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling a vehicle system having a plurality of connected power units, at least one said power unit having a sub-unit controller in communication with an efficiency controller remotely located from said sub-unit controller, said method comprising the steps of:

the at least one sub-unit controller determining an efficiency of its associated power unit;

the at least one sub-unit controller determining present operational data of its associated power unit;

the efficiency controller determining a torque to be provided to the vehicle system by the plurality of connected power units;

the efficiency controller determining a plurality of optimization constraints as a function of said torque to be provided, said present operational data and said efficiency of the power unit associated with the at least one sub-unit controller;

the efficiency controller determining an optimized operation mode of the power unit associated with the at least one sub-unit controller as a function of said optimization constraints and said present operational data of the power unit; and the at least one sub-unit controller manipulating its associated power unit to operate in said optimized operation mode.

2. The method of controlling a vehicle system of claim 1, wherein said step of determining a torque to be provided to the vehicle system comprises the steps of:

determining a desired torque;

determining an available torque from the vehicle system; and arbitrating between using said available torque to meet said desired torque and using said available torque for an alternative operation.

3. The method of controlling a vehicle system of claim 2, wherein said step of determining a desired torque is achieved via a desired torque input.

4. The method of controlling a vehicle system of claim 3, wherein said desired torque input is an accelerator.

5. The method of controlling a vehicle system of claim 3, wherein said desired torque input is a cruise control system.

6. The method of controlling a vehicle system of claim 2, wherein said alternative operation is traction control.

7. The method of controlling a vehicle system of claim 1, wherein said manipulating the power unit occurs through actuation of an actuator associated with the power unit.

8. The method of controlling a vehicle system of claim 1, further comprising the steps of:

providing an actuator between said at least one sub-unit controller and its associated power unit; and providing a sensor between said at least one sub-unit controller and its associated power unit;

wherein said efficiency controller receives said present operational data and said efficiency of the power unit from said at least one sub-unit controller.

9. A method of controlling a vehicle system having a plurality of connected power-consuming components at least one of which has an associated sub-unit controller, the method comprising the steps of:

providing an efficiency controller in communication with the sub-unit controller;

providing an actuator associated with the power unit and in communication with the sub-unit controller;

providing a sensor associated with the power unit and in communication with the sub-unit controller, wherein said sensor determines present operational data of the power unit and communicates said present operational data to the sub-unit controller;

determining an efficiency of the power unit and communicating said efficiency to said efficiency controller;

determining a torque to be provided to the vehicle system; and determining a plurality of optimization constraints as a function of said torque to be provided, said present operational data and said efficiency of the power unit;

wherein said efficiency controller determines an optimized operation mode of the power unit as a function of said optimization constraints and said present operational data and communicates to said sub-unit controller to operate said actuator for manipulating the power unit to operate in said optimized operation mode.

10. The method of controlling a vehicle system of claim 9, wherein said efficiency is a present efficiency of the power unit.

11. The method of controlling a vehicle system of claim 9, wherein said efficiency is a theoretical efficiency of the power unit determined as a function of an operational scenario presented by the efficiency controller.

12. The method of controlling a vehicle system of claim 9, wherein said step of determining a torque to be provided to the vehicle system comprises the steps of:

determining a desired torque;

determining an available torque from the vehicle system; and arbitrating between using said available torque to meet said desired torque and using said available torque for an alternative operation for determining said torque to be provided to the vehicle system.

13. The method of controlling a vehicle system of claim 12, wherein said step of determining a desired torque is achieved via a desired torque input.

14. The method of controlling a vehicle system of claim 13, wherein said desired torque input is an accelerator.

15. The method of controlling a vehicle system of claim 13, wherein said desired torque input is a cruise control system.

16. The method of controlling a vehicle system of claim 12, wherein said alternative operation is traction control.

17. A vehicle comprising:

a powertrain having a plurality of connected power units;

a sub-unit controller associated with at least one of said power units and calculating the efficiency of its associated power unit;

an actuator between said power unit and said sub-unit controller for selectively manipulating operation of said power unit;

a sensor between said power unit and said sub-unit controller; and an efficiency controller in communication with said sub-unit controller;

wherein said efficiency controller receives present operational data and efficiency data from said sub-unit controller for determining an optimized operation mode of said power unit and accordingly requests said sub-unit controller to operate said power unit in said optimized operation mode, said sub-unit controller achieving said optimized operation mode via said actuator.

18. The vehicle of claim 17, wherein said efficiency data is a present efficiency of said power unit.

19. The vehicle of claim 17, wherein said efficiency data is a theoretical efficiency of said power unit determined as a function of an operational scenario presented by said efficiency controller.

20. The vehicle of claim 17, wherein said power unit is an engine.

21. The vehicle of claim 17, wherein said power unit is a transmission.

22. The vehicle of claim 17, wherein said efficiency controller determines said optimized operation mode by:

determining present operational data of said power unit;

determining a torque to be provided to said powertrain; and determining a plurality of optimization constraints as a function of said torque to be provided, said present operational data and said efficiency of said power unit.

23. The vehicle of claim 22, wherein said efficiency controller determines a torque to be provided to said powertrain by:

determining a desired torque;

determining an available torque from said powertrain; and arbitrating between using said available torque to meet said desired torque and using said available torque for an alternative operation.

24. The vehicle of claim 23, wherein determining a desired torque is achieved via a desired torque input.

25. The vehicle of claim 24, wherein said desired torque input is an accelerator.

26. The vehicle of claim 24, wherein said desired torque input is a cruise control system.

27. The vehicle of claim 23, wherein said alternative operation is traction control.

* * * * *